United States Patent
Bucknell et al.

(10) Patent No.: US 6,827,054 B2
(45) Date of Patent: Dec. 7, 2004

(54) INTEGRATED INLET MANIFOLD TUNING VALVE AND CHARGE MOTION CONTROL DEVICE FOR INTERNAL COMBUSTION ENGINES

(75) Inventors: John R. Bucknell, Royal Oak, MI (US); Alejandro Reguiero, White Lake, MI (US); Darryl Muir, Almont, MI (US); Mark A. Simonich, Highland, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/310,785

(22) Filed: Dec. 6, 2002

(65) Prior Publication Data

US 2004/0107934 A1 Jun. 10, 2004

(51) Int. Cl.[7] .............................................. F02M 35/10
(52) U.S. Cl. ................................................. 123/184.53
(58) Field of Search ....................... 123/184.53, 184.54, 123/184.52, 184.45, 306, 184.42, 184.34, 336, 337

(56) References Cited

U.S. PATENT DOCUMENTS

| 5,267,543 A | * | 12/1993 | Novak et al. ............... 123/306 |
| 5,526,789 A | | 6/1996 | Stein et al. |
| 5,592,916 A | | 1/1997 | Stockhausen et al. |
| 5,632,239 A | | 5/1997 | Patyi et al. |
| 5,709,182 A | * | 1/1998 | Espe et al. ............. 123/184.55 |
| 6,155,229 A | | 12/2000 | Cantrell, Jr. et al. |
| 6,581,566 B2 | * | 6/2003 | Oishi ......................... 123/306 |

OTHER PUBLICATIONS

C498/15/169/95, R.F. Duckworth and D. Pates, *Combustion stability improvements through the use of port mounted barrel throttles*, IMechE 1996.
SAE Technical Paper Series, 2000–01–0890, K. Nishizawa, S. Momoshima, M. Koga, and H. Tsuchida, *Development of New Technologies Targeting Zero Emissions for Gasoline Engines*, Mar. 6–9, 2000.
SAE Technical Paper Series, 2000–01–1583, K. Nishizawa, S. Momoshima and M. Koga, *Nissan's Gasoline SULEV Technology*, Apr. 2–6, 2000.

* cited by examiner

Primary Examiner—Tony M. Argenbright
Assistant Examiner—Hyder Ali
(74) Attorney, Agent, or Firm—Thomas A. Jurecko

(57) ABSTRACT

An integrated inlet manifold tuning valve for a variable configuration air inlet manifold and a charge motion control system. A tuning valve, which is preferably approximately a quarter-barrel valve, is arranged at an end of the low- and high-speed runners at or near an intake port for an internal combustion engine. The tuning valve operates to tune the variable manifold and provide a mixture motion for charge motion control.

8 Claims, 2 Drawing Sheets

INTEGRATED INLET MANIFOLD TUNING VALVE AND CHARGE MOTION CONTROL DEVICE FOR INTERNAL COMBUSTION ENGINES

BACKGROUND AND SUMMARY OF THE INVENTION

This invention relates to a control strategy of variable geometry intake manifolds for engines and charge motion control valves.

Variable geometry intake manifolds for engines are known. In an intake manifold with variable geometry, the intake air is controlled to different runners to provide varying conditions at the intake port of the cylinder. In operation, air may be directed through a low-speed runner which may comprise a longer path for the intake air and a high-speed runner which may be a more direct path to the intake port. In order to control the intake air, valves at the start of the high-speed runner may be provided. These valves, when closed, direct the intake air down the low-speed runner. When open, these valves allow a more direct route to the intake port down the high-speed runner. The high speed runner is usually closed off during low-speed and low-power requirement conditions. During high-speed or high-power conditions, the high-speed runner is usually open.

A charge motion control system is known incorporating charge motion control valves near the intake port. The charge motion control valves provide a tumble to the incoming intake air at or near the intake port of the cylinder. The tumble motion is usually imparted on the intake air by the charge motion control valve restricting or closing most of the cross-section of the intake port manifold. This allows the incoming intake air to be diverted through a smaller cross-sectional area and thereby produce a downstream tumble which, then, proceeds into the intake port and cylinder to provide a mixing motion.

An aspect of the invention is to integrate the control system for the variable geometry manifold and the charge motion control device for internal combustion engines. By integrating these controls, the overall control strategy is simplified.

This aspect may be achieved by a tuning valve for an internal combustion engine with a barrel valve arranged adjacent to an intake port of a cylinder and operable in a first position to close a high-speed runner of the variable geometry manifold. The barrel valve, in a second position, operatively closes the high-speed runner and provides charge motion control to intake air and a low-speed runner. This reduces the complexity of the inlet manifolds with inlet port charge motion control devices and with variable configuration air paths by way of movable valves by performing both functions with the same device. Thus, two independent devices for manifold geometry configuration, namely, variable geometry manifolds for the use of manifold tuning valves and charge motion control valves for in-cylinder burn rate improvement, are not required in that one valve operatively controls both the charge motion control and the variable geometry manifold.

The barrel valve can be a segment of between 45° and 180°. Preferably, the barrel valve is approximately a quarter-barrel. The barrel valve is rotatable from a first position which provides no reduction in intake port cross-section where the barrel valve is rotated flush with the intake port side. In a second position, the barrel valve rotates to close the high-speed runner but does not reduce the cross-section of the low-speed runner. In the second position, a radius of the barrel valve connects a side of the low-speed runner to the intake port side. In a third position, the barrel valve rotates fully closed to restrict the low-speed runner cross-section. In this position, a small distance is located between the low-speed runner and the barrel valve circumference. This distance or space provides a point of maximum velocity which induces mixture motion or tumble to the incoming intake air in the intake port. The circumference of the barrel valve is located upstream in this position, and the radius is located downstream providing a reduced cross-section to the intake port.

In certain preferred embodiments, a tuning valve is arranged in an internal combustion engine. The internal combustion engine has a variable configuration air intake manifold with a low-speed runner and a high-speed runner. The engine includes a cylinder head for a combustion cylinder, the cylinder head having an intake port for intake air for the cylinder. The tuning valve is arranged between the runners and the intake port and operably closes the high-speed runner to vary the configuration of the intake manifold. The tuning valve also operates to impart a charge motion control to the intake air via the low-speed runner. The tuning valve may be a blade-type valve.

In a preferred embodiment, a tuning valve is a barrel valve, of a 45° to 180° segment. Preferably, the tuning valve is a barrel-valve of approximately a 90° segment. The tuning valve may operate to throttle the engine.

Preferably, the tuning valve rotates to supply a full range of flow restrictions from part-load to fully closed.

Other objects, advantages and novel features of the present invention will become apparent from the following detailed description of the invention when considered in conjunction with the accompanying drawings.

DETAILED DESCRIPTION OF THE DRAWINGS

Figure 1:
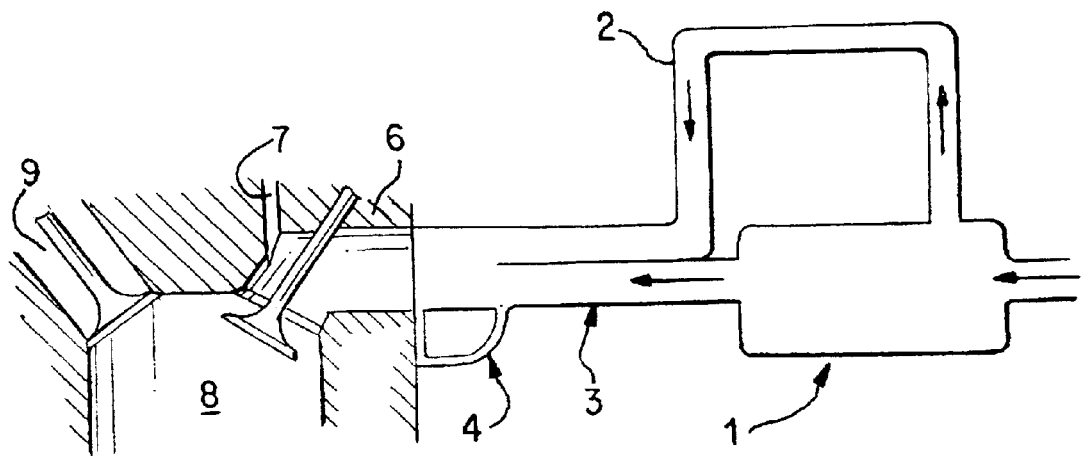
FIG. 1 shows a diagrammatic view of a variable configuration intake air manifold and cylinder head.

FIG. 1 shows a variable configuration intake air manifold 1 having a low-speed runner 2 and a high-speed runner 3. The low-speed runner 2 may have a longer pathway than the high-speed runner 3. Intake air enters the manifold and continues into the plenum whereafter the intake air follows one of the runners. In high-load situations, the intake air mostly follows the high-speed runner 3. However, as both runners 2, 3 are open, some of the intake air follows the low-speed runner 2. In order to vary the configuration of the manifold 1, a tuning valve 4 is provided. The tuning valve operates to close the high-speed runner 3 in lower load situations. Downstream of the variable configuration intake air manifold 1, a cylinder head 5 of an internal combustion engine is provided. In the cylinder head 5, an intake port 6 is positioned to admit the intake air from the manifold 1. An injector 7 may be provided in the cylinder head to inject a fuel or air/fuel mixture into the incoming intake air. The intake air is admitted into the combustion cylinder 8 by way of the intake port 6. The combustion cylinder 8 also has an exhaust port 9 to exhaust the spent fuel and mixture.

Figure 2:
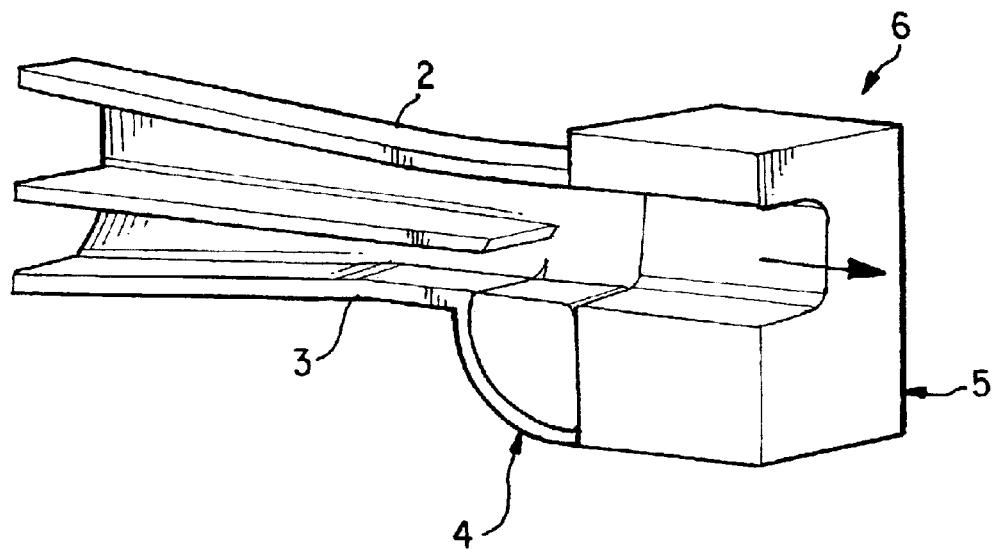
FIG. 2 shows a view of the tuning valve set for high-speed tuning.
Figure 3:
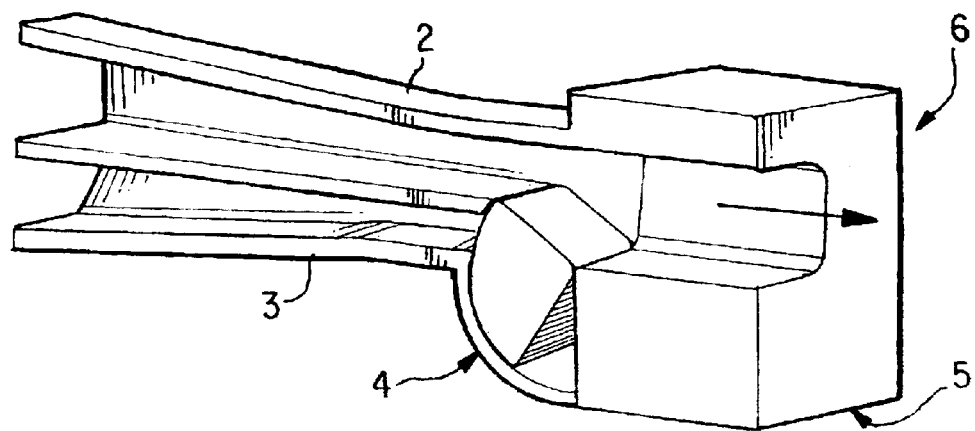
FIG. 3 shows a view of the tuning valve set for low-speed tuning.
Figure 4:
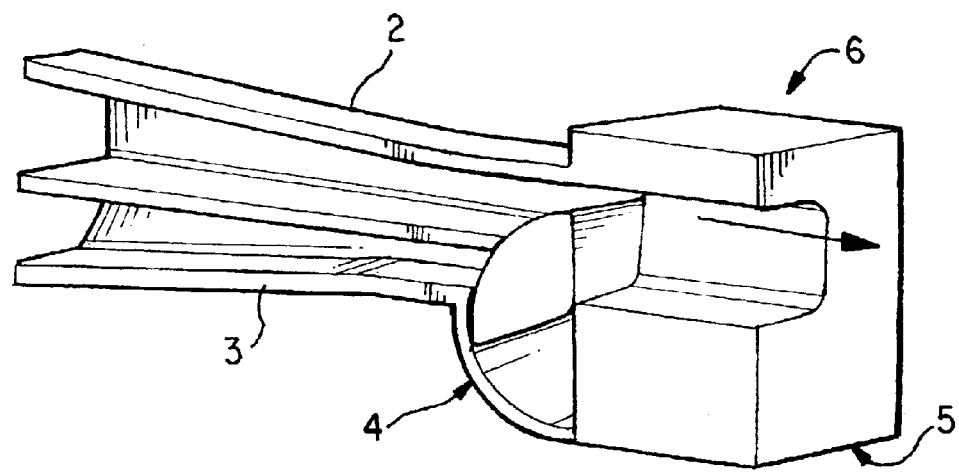
FIG. 4 shows a tuning valve closed for charged motion control.

The operation of the tuning valve is shown in FIGS. 2–4. In FIG. 2, the tuning valve is in a position for high-speed tuning, whereby the low-speed runner 2 and the high-speed runner 3 are both open. The tuning valve in FIG. 2, shown as a quarter-barrel, is flush against the side of the high-speed runner and does not provide a reduced cross-section to either of the runners. A radius of the quarter-barrel tuning valve 4, shown in FIG. 2, provides a smooth transition from the side of the high-speed runner 3 to the intake port 6.

In the case of a lower load, the tuning valve 4 rotates and closes off the high-speed runner 3 by extending a radius to the side of the low-speed runner 2. A circumference of the tuning valve blocks the high-speed runner, and a radius of the tuning valve 4 provides a smooth transition from a side of the low-speed runner to the exhaust port 6. As shown in FIG. 3, the intake air flowing in the low-speed runner may encounter a further slowing at the tuning valve by way of the expansion of the cross-section from the low-speed runner 2 to the intake port 6.

When the tuning valve is fully closed, as shown in FIG. 4, a charge motion control is provided to the intake air. In the charge motion control position, the tuning valve has a circumference closing off the high-speed runner 3, and a circumference restricting the cross-section of the low-speed runner 2. The radius of the tuning valve may act as a gate or restriction to the intake port. A small space provided between the circumference of the tuning valve and the upper side of the intake port provides a point of maximum velocity 10 which induces a mixture motion into the intake port by the incoming intake air. This mixture motion or tumbling continues down the intake port and into the combustion cylinder in order to provide a burn rate improvement within the cylinder.

Figure 5:
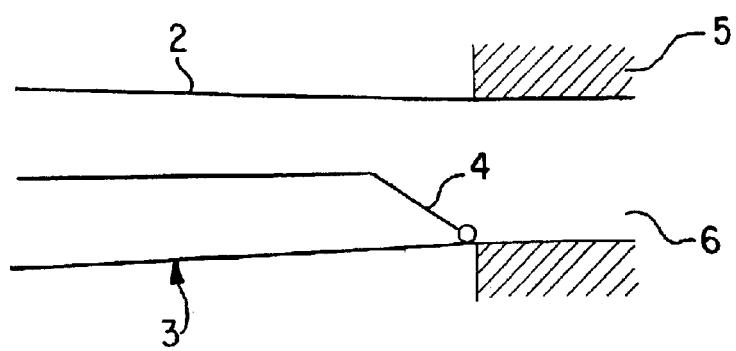
FIG. 5 shows a tuning valve of the blade-type.

Thus, the control of a charge motion control system and a tuning valve or control system for a variable configuration air manifold are combined or integrated into one valve. FIG. 5 shows another embodiment of the tuning valve 4. FIG. 5 shows a blade-type valve positioned so that, on rotation, the tuning valve 4 may close off the high-speed runner 3 and, upon further rotation, restrict the incoming intake air of the low-speed runner 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
   a variable configuration air intake manifold with a low-speed runner and a high-speed runner,
   a cylinder head for a combustion cylinder, the cylinder head having an intake port with an undivided flow path for intake air for the cylinder, and
   a tuning valve positioned between the runners and the intake port, the valve having a circumference side arranged to rotateably engage the runners and operable to close the high-speed runner to vary the configuration of the intake manifold and operable to provide a reduced cross-section to the low-speed runner to produce a mixture motion to the intake air prior to entering the intake port.

2. The internal combustion engine according to claim 1, wherein the tuning valve is a barrel valve.

3. The internal combustion engine according to claim 2, wherein the barrel valve is a 45° to 180° segment.

4. The internal combustion engine according to claim 2, wherein the barrel valve is approximately a 90° segment.

5. The internal combustion engine according to claim 1, wherein the tuning valve is a blade valve.

6. The internal combustion engine according to claim 1, wherein the tuning valve operably throttles the engine.

7. The internal combustion engine according to claim 1, wherein, in a first position, the tuning valve provides no reduction in cross-section of the intake port.

8. The internal combustion engine according to claim 1, wherein the tuning valve is rotatable to supply a range of flow restrictions from part-load to fully closed.

* * * * *